US012808469B2

(12) United States Patent
Kimura et al.

(10) Patent No.: US 12,808,469 B2
(45) Date of Patent: Nov. 24, 2026

(54) GASKET AND JOINT STRUCTURE

(71) Applicant: IHARA SCIENCE CORPORATION, Tokyo (JP)

(72) Inventors: Miyoshi Kimura, Isesaki (JP); Daisuke Nishida, Yamagata (JP)

(73) Assignee: IHARA SCIENCE CORPORATION, Tokyo (JP)

( * ) Notice: Subject to any disclaimer, the term of this patent is extended or adjusted under 35 U.S.C. 154(b) by 0 days.

(21) Appl. No.: 19/072,136

(22) Filed: Mar. 6, 2025

(65) Prior Publication Data

US 2025/0290580 A1 Sep. 18, 2025

(30) Foreign Application Priority Data

Mar. 13, 2024 (JP) ................................ 2024-038620

(51) Int. Cl.
*F16L 23/18* (2006.01)

(52) U.S. Cl.
CPC .................................. *F16L 23/18* (2013.01)

(58) Field of Classification Search
CPC .............. F16J 15/06; F16J 15/08; F16L 23/18
See application file for complete search history.

(56) References Cited

U.S. PATENT DOCUMENTS 5,103,915 A * 4/1992 Sweeney ................ E21B 33/03 285/334.2
6,722,426 B2 * 4/2004 Sweeney .............. F16J 15/0887 166/115
10,161,213 B2 * 12/2018 Boulanger ............ E21B 33/038
10,704,712 B1 * 7/2020 Boulanger .............. F16L 23/22
11,073,209 B2 * 7/2021 Takeda ................. F16J 15/3432
11,990,354 B2 * 5/2024 Melcer .................. F16K 27/003
12,062,553 B2 * 8/2024 Melcer .................. F16K 27/003

(Continued)

FOREIGN PATENT DOCUMENTS

CN 103168189 B 2/2016
CN 116928385 A 10/2023

(Continued)

OTHER PUBLICATIONS

Taiwan Intellectual Property Office, Office Action and Search Report Issued in Application No. 114108429, Nov. 27, 2025, 6 pages.

(Continued)

*Primary Examiner* — Christine M Mills
*Assistant Examiner* — L. Susmitha Koneru
(74) *Attorney, Agent, or Firm* — Alleman Hall LLP

(57) ABSTRACT

The present invention eliminates a dead space between a gasket and flanges and the present invention is an annular gasket 30 attached between planar seal surfaces 12*x* of opposing flange portions 12, in which steps 30*d* are formed between radially inner surfaces 30*b* continuous with an inner peripheral surface 30*a* and radially outer surfaces 30*c*, each radially inner surface 30*b* is located axially outward the corresponding radially outer surface 30*c*, the radially inner surface 30*b* and the radially outer surface 30*c* each have a planar shape orthogonal to an axial direction, and each radially outer surface 30*c* comes into contact with the corresponding seal surface 12*x* after each radially inner surface 30*b* comes into contact with the corresponding seal surface 12*x*.

5 Claims, 8 Drawing Sheets

(56) References Cited

U.S. PATENT DOCUMENTS

| | | | | |
|---|---|---|---|---|
| 12,183,597 | B2 * | 12/2024 | Treur | H10P 72/0402 |
| 12,584,554 | B2 * | 3/2026 | Leaning | F16J 15/0887 |
| 2002/0074798 | A1 * | 6/2002 | Duzick | F16J 15/061 285/379 |
| 2003/0000694 | A1 * | 1/2003 | Sweeney | E21B 33/02 166/115 |
| 2005/0242519 | A1 * | 11/2005 | Koleilat | F16L 17/02 277/434 |
| 2016/0138718 | A1 | 5/2016 | Lee et al. | |
| 2018/0030804 | A1 * | 2/2018 | Boulanger | E21B 33/038 |
| 2021/0159093 | A1 * | 5/2021 | Melcer | F16K 27/003 |

FOREIGN PATENT DOCUMENTS

| | | | |
|---|---|---|---|
| JP | 54133213 | A | 10/1979 |
| JP | 61070551 | U | 5/1986 |
| JP | 63129769 | U | 8/1988 |
| JP | 2002317889 | A | 10/2002 |
| JP | 2003343726 | A | 12/2003 |
| JP | 2009115160 | A | 5/2009 |
| JP | 2011064222 | A | 3/2011 |
| JP | 2013185618 | A | 9/2013 |
| JP | 2016538485 | A | 12/2016 |
| JP | 2018017381 | A | 2/2018 |
| JP | 2020523541 | A | 8/2020 |
| JP | 2022067340 | A | 5/2022 |
| WO | 2015047100 | A1 | 4/2015 |
| WO | 2018231235 | A1 | 12/2018 |

OTHER PUBLICATIONS

Japan Patent Office, Office Action Issued in Application No. 2024-038620, Jun. 20, 2024, 8 pages.

Japan Patent Office, Office Action Issued in Application No. 2024-038620, Aug. 5, 2024, 5 pages.

* cited by examiner (a) SEAL SURFACE SEPARATED FROM GASKET (b) SEAL SURFACE IN SURFACE CONTACT WITH RADIALLY INNER SURFACE (c) SEAL SURFACE IN SURFACE CONTACT WITH RADIALLY OUTER SURFACE

GASKET AND JOINT STRUCTURE

CROSS-REFERENCE TO RELATED APPLICATION(S)

The present application claims priority from Japanese Patent Application No. 2024-038620 filed Mar. 13, 2024, which is incorporated herein by reference in its entirety.

BACKGROUND OF THE INVENTION

Technical Field

The present invention relates to a gasket and a joint structure using the gasket.

Description of the Related Art

A conventional pipe joint includes first and second joint members having mutually communicated fluid passages and a gasket interposed between abutting end surfaces of the first and second joint members, and is formed with an annular seal projection on each abutting end surface (a seal surface) of the first and second joint members, as disclosed in JP 2018-17381 A. In this pipe joint, each annular seal projection bites into a corresponding axial end surface of the gasket, thereby improving adhesion between the seal projections and the gasket.

In the structure in which the gasket is crushed by the seal projections formed on the seal surfaces, however, a dead space may be formed between the gasket and the seal surfaces on a gas contact side of the gasket (radially inside the seal projections). The dead space causes gas to stay in the dead space. For example, when the pipe joint having the structure described above is used in semiconductor manufacturing processes, high-purity material gas stays in the dead space between the gasket and the seal surfaces, adversely affecting concentration management of the high-purity material gas.

PRIOR ART DOCUMENT

Patent Document

Patent Document 1: JP 2018-17381 A

SUMMARY OF THE INVENTION

Hence, the present invention has been made to solve the problem described above, and a main object of the present invention is to ensure that a dead space between a gasket and flange portions is eliminated.

A gasket according to the present invention is an annular gasket attached between planar seal surfaces of opposing flange portions, in which steps are formed between axial end surfaces on a radially inner side continuous with an inner peripheral surface, which are hereinafter referred to as radially inner surfaces, and axial end surfaces on a radially outer side, which are hereinafter referred to as radially outer surfaces, each radially inner surface is located axially outward the corresponding radially outer surface, the radially inner surface and the radially outer surface each have a planar shape orthogonal to an axial direction, and each radially outer surface comes into contact with the corresponding seal surface after each radially inner surface comes into contact with the corresponding seal surface.

According to the gasket having the configuration described above, the radially inner surface comes into contact with the seal surface to be plastically deformed and then the radially outer surface comes into contact with the seal surface when the flange portions are fastened. Therefore, scalability maximizes at a gas contact side (the radially inner side) of the gasket, reliably eliminating a dead space between the gasket and the flange portions. In addition, since the gas contact side has the highest sealability, leakage is detected when a dead space is formed. The presence or absence of a dead space can therefore be detected by a leak test such as a helium leak test.

In order to relieve a deformation not to the radially inner side (a flow path side) but to the radially outer side when the radially inner surface is plastically deformed, a groove is desirably formed along the circumferential direction between the radially inner surface and the radially outer surface.

As a specific embodiment of the gasket, a dimension of the step along the axial direction is desirably 0.03 to 0.09 mm.

In addition, a joint structure according to the present invention is a joint structure in which flange portions are fastened together in a state where an annular gasket is sandwiched between planar seal surfaces of the opposing flange portions, in which steps are formed between axial end surfaces on a radially inner side continuous with an inner peripheral surface, which are hereinafter referred to as radially inner surfaces, and axial end surfaces on a radially outer side, which are hereinafter referred to as radially outer surfaces in the gasket, each radially inner surface is located axially outward the corresponding radially outer surface, the radially inner surface and the radially outer surface each have a planar shape orthogonal to an axial direction, and each radially outer surface comes into contact with the corresponding seal surface after each radially inner surface comes into contact with the corresponding seal surface.

In order to improve the sealability between the gasket and the seal surfaces, it is desirable that at least the radially inner surfaces are plastically deformed causing the radially inner surfaces and the radially outer surfaces to be flush with each other in a state where the flange portions are fastened together.

In order to improve the sealability between the gasket and the seal surfaces and increase the number of repeated uses, it is desirable that the seal surfaces are mirror-finished.

The present invention described above is capable of reliably eliminating a dead space between the gasket and the flange portions.

DETAILED DESCRIPTION

An Embodiment of the Present Invention

Figure 1:
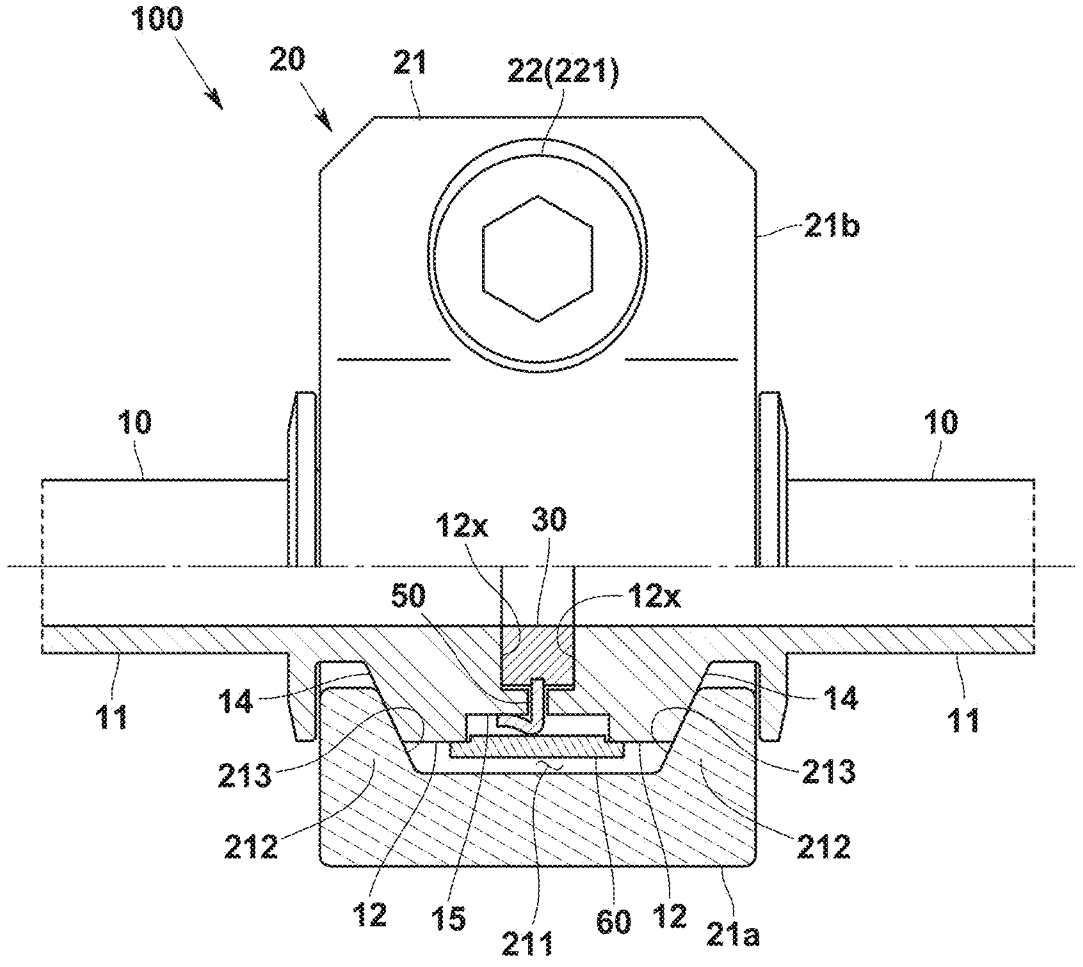
FIG. 1 is a partial sectional view of a joint structure according to an embodiment of the present invention.

Hereinafter, an embodiment of a joint structure according to the present invention will be described with reference to the drawings. It should be noted that any of the drawings referred to below are schematically omitted or exaggerated as appropriate for easy understanding. Same components are denoted with the same reference numerals; therefore, description thereof will be omitted as appropriate.

As illustrated in FIG. 1, a joint structure 100 of the present embodiment is formed by connecting a pair of pipe members 10 by a clamp joint 20. Specifically, the joint structure 100 includes the clamp joint 20 that connects the pair of pipe members 10 to each other with the pair of pipe members 10 facing each other and an annular gasket 30 interposed between the pair of pipe members 10. The joint structure 100 air-tightly connects the pair of pipe members 10.

The pipe member 10 includes a pipe body 11 in which a linear flow path is formed and a flange portion 12 provided at an end of the pipe body 11. A planar seal surface 12*x* in close contact with the gasket 30 is formed on a tip surface of the flange portion 12. The seal surface 12*x* has a planar shape orthogonal to an axial direction. The seal surface 12*x* is mirror-finished. In addition, an inclined surface 14 whose diameter increases toward a tip is formed on a back surface opposite to a facing surface (the tip surface) of the flange portion 12. Further, a step portion 15 having a reduced diameter dimension is formed on an outer peripheral surface of the flange portion 12. A holder 50 holding the gasket 30 is attached to the step portion 15. In addition, a dust-proof annular protector 60 may be attached to an outer periphery of the step portion 15 as necessary.

The clamp joint 20 is fitted over the flange portions 12 facing each other to fasten and couple the flange portions 12 together. Specifically, as illustrated in FIGS. 1 to 4, the clamp joint 20 has a clamp body 21 in which recessed grooves 211 are provided on an inner peripheral surface so as to extend in a circumferential direction and a fastening mechanism 22 for fastening the clamp body 21 so as to reduce an inner diameter of the clamp body 21.

The clamp body 21 has a series of clamp elements 21*a* to 21*c* that are adjacent to each other and rotatably connected to each other. Specifically, the clamp body 21 has one central clamp element 21*a* and a pair of outer clamp elements 21*b* and 21*c* rotatably connected to respective ends of the central clamp element 21*a*. Each of the clamp elements 21*a* to 21*c* is made of stainless steel such as SUS630 or SUS316.

Figure 4:
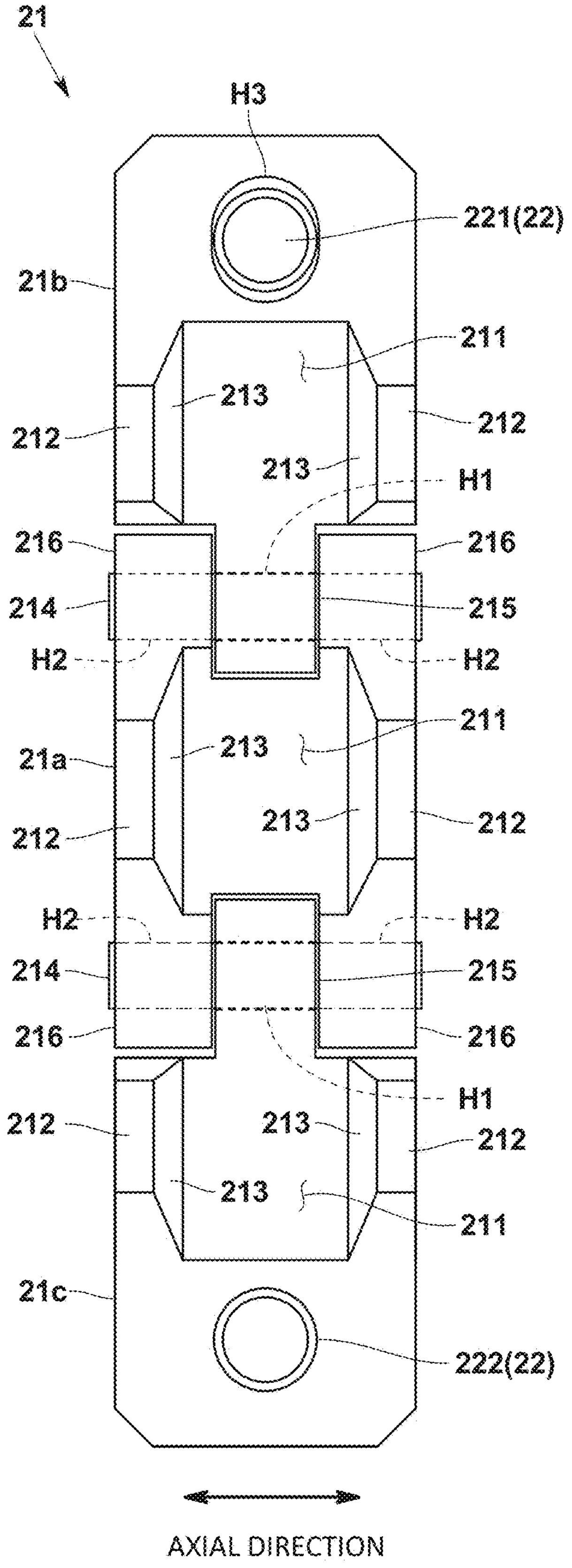
FIG. 4 is a plan view illustrating a state in which the clamp joint of the embodiment is developed.
Figure 5:
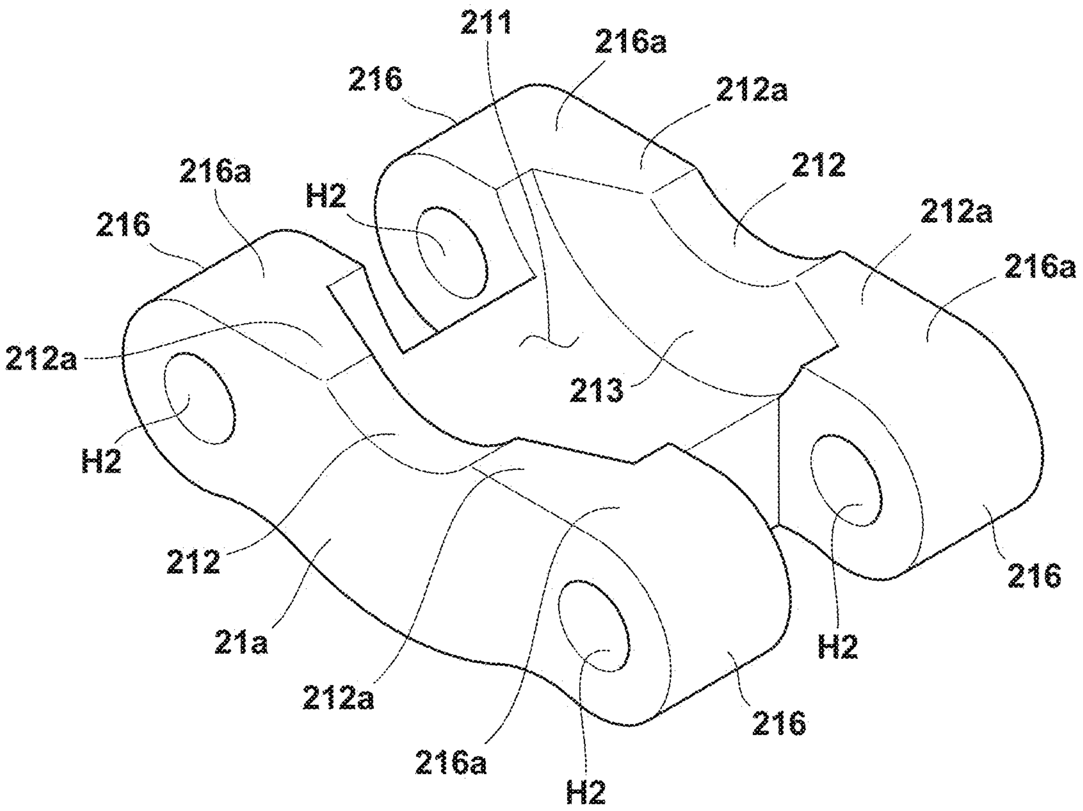
FIG. 5 is a perspective view of a central clamp element in the embodiment.

As particularly illustrated in FIGS. 1 and 4, each recessed groove 211, having a width fittable over outer peripheral edge portions of the pair of facing flange portions 12, is formed in an inner peripheral surface of each of the clamp elements 21*a* to 21*c* so as to extend in the circumferential direction. Inclined surfaces 213 corresponding to the inclined surfaces 14 of the flange portions 12 are formed on an inner surface of each of the pair of side wall portions 212 forming the recessed groove 211. In addition, the recessed groove 211 of each of the clamp elements 21*a* to 21*c* has a depth that a bottom surface of the recessed groove 211 does not contact an outer peripheral surface of the flange portion 12, while the inclined surface 213 of the side wall portion 212 being in contact with the inclined surface 14 of the flange portion 12.

The clamp elements 21*a* to 21*c* are rotatably connected to each other by hinge pins 214. The hinge pins 214 are made of stainless steel such as SUS630, SUS316, or SUS304. The hinge pins 214 are preferably made of a material having strength equal to or greater than that of the material of each of the clamp elements 21*a* to 21*c*.

As illustrated in FIG. 4, a first connection portion 215, which has an insertion hole H1 through which the hinge pin 214 is inserted, is formed at an end of each of the pair of outer clamp elements 21*b* and 21*c* connected to the central clamp element 21*a*.

The first connection portion 215 is constituted by a protrusion protruding toward the central clamp element 21*a* at the end of each of the outer clamp elements 21*b* and 21*c*. A width (an axial dimension) of the protrusion is smaller than a distance between the pair of side wall portions 212 forming the recessed groove 211 (the width of the bottom surface of the recessed groove 211) (see FIG. 4).

In addition, a pair of second connection portions 216, sandwiching the first connection portion 215 of each of the outer clamp element 21*b* and 21*c* and having a fixation hole H2 to which the hinge pin 214 is fixed, are formed at respective ends of the central clamp element 21*a*. The hinge pin 214 is fixed to the fixation hole H2 by caulking, press-fitting, or the like.

The pair of second connection portions 216 sandwich the protrusion, which serves as the first connection portion 215, from both sides in the axial direction with a slight gap interposed between the second connection portions 216 and the first connection portion 215. Each of both ends of the central clamp element 21*a* is formed with a recess into which the protrusion which is the first connection portion 215 is fitted with a slight gap between the recess and the protrusion. Wall portions along the axial direction forming the recess serve as the second connection portions 216. Each of the pair of second connection portions 216 is positioned, in the circumferential direction, on an extension line of the pair of side wall portions 212 forming the recessed groove 211 (see FIG. 4).

As illustrated in FIGS. 2 to 5, upper surface portions 212*a* of the pair of side wall portions 212 provided in the central clamp element 21*a* are formed from the pair of second connection portions 216 on one end to the pair of second connection portions 216 on the other end in the circumferential direction. That is, the side wall portion 212 is formed such that the upper surface portion 212*a* of the side wall portion 212 is connected to both the second connection portion 216 on one end and the second connection portion 216 on the other end. In the present embodiment, an upper surface portion 216*a* of the second connection portion 216 and the upper surface portion 212*a* of the side wall portion 212 are linearly continuous as viewed from the axial direction. In addition, an inclined surface 213 corresponding to the inclined surface 14 of the flange portion 12 is formed on the entire inner surface of each of the pair of side wall portions 212 of the central clamp element 21*a*.

Further, in terms of a relationship between the central clamp element 21*a* and the outer clamp elements 21*b* and 21*c*, a shape that avoids interference between the side wall portions 212 of the central clamp element 21*a* and the side wall portions of the outer clamp elements 21*b* and 21*c* is different from the conventional one. In the present embodiment, each gap formed between the side wall portions 212 of the central clamp element 21*a* and the side wall portions of the outer clamp elements 21*b* and 21*c* does not extend from the hinge pins 214 toward an axial center, but extends along a direction orthogonal to a radial direction from the axial center (a left-right direction in FIG. 2 and a direction in which the two hinge pins 214 are arranged).

The fastening mechanism 22 fastens a free end of each of the pair of outer clamp elements 21*b* and 21*c* together. Specifically, as illustrated in FIGS. 1 to 4, the fastening mechanism 22 includes a bolt member 221 rotatably provided in a through hole H3 formed in the free end of one outer clamp element 21*b* and a female screw hole 222 formed in the free end of the other outer clamp element 21*c*. Screwing the bolt member 221 into the female screw hole 222 connects the pair of outer clamp elements 21*b* and 21*c* to each other and enables scaling an inner peripheral diameter of the clamp body 21. The bolt member 221 is made of stainless steel such as SUS304 or SUS316.

As particularly illustrated in FIG. 4, the through hole H3 formed at the free end of the one outer clamp element 21*b* has an oval shape extending along the radial direction. The oval-shaped through hole H3 absorbs the inclination of the bolt member 221 with respect to the one outer clamp element 21*b* when the bolt member 221 is screwed into the female screw hole 222. In addition, a stopper ring 223 prevents the bolt member 221 from being removed from the through hole H3.

Figure 2:
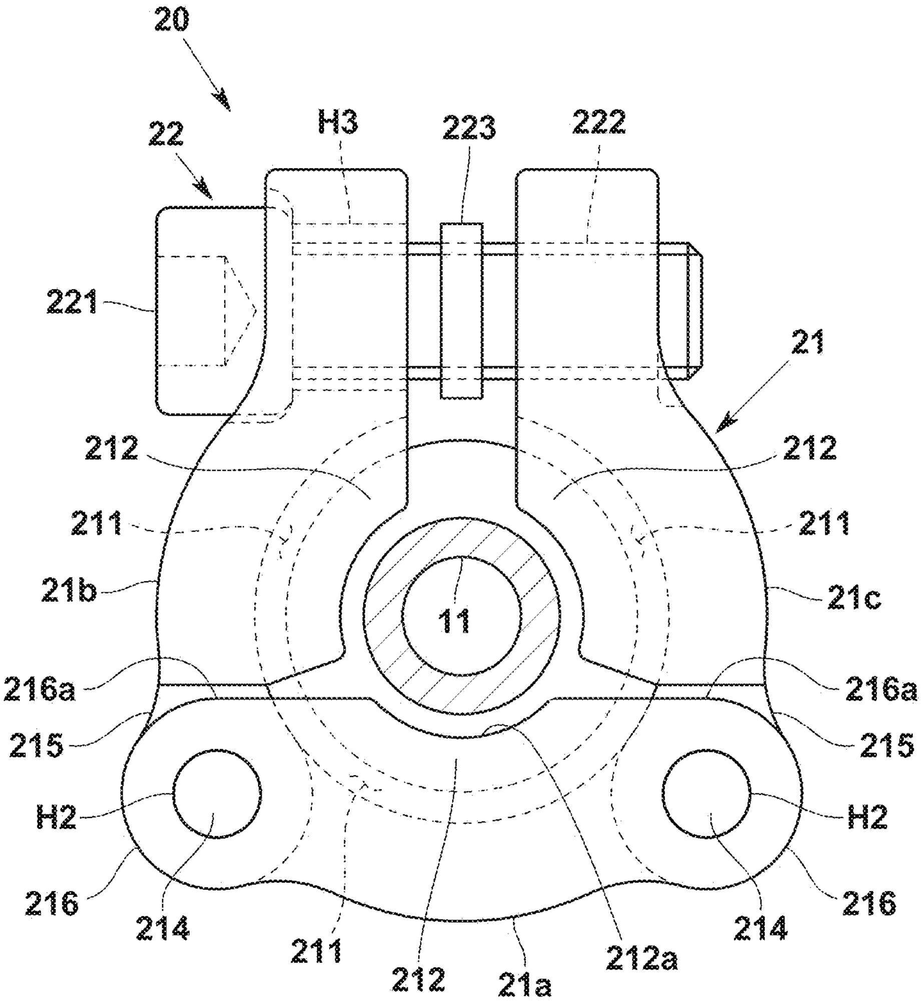
FIG. 2 is a view illustrating a state in which a clamp joint of the embodiment is fastened as viewed from an axial direction.
Figure 3:
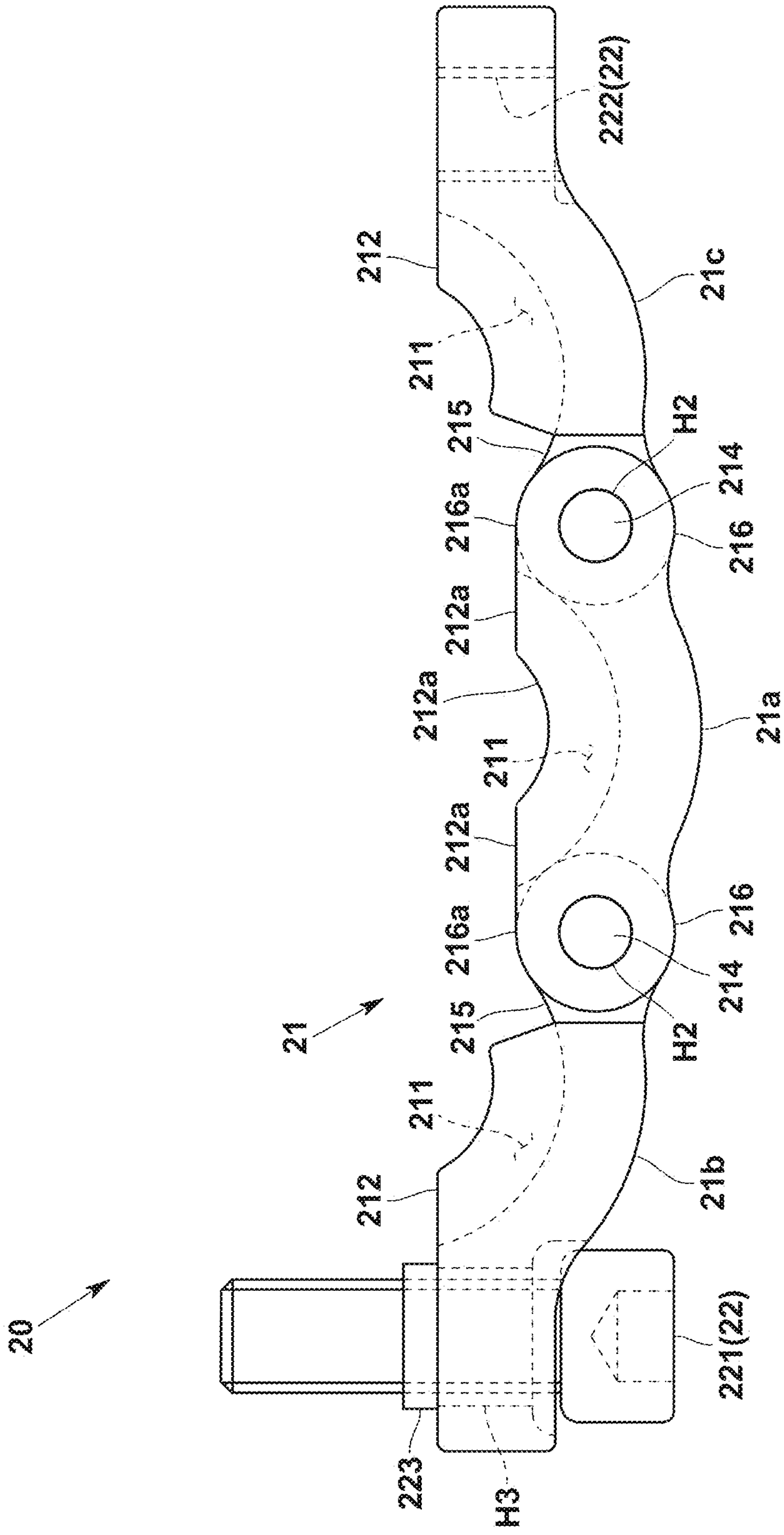
FIG. 3 is a view illustrating a state in which the clamp joint of the embodiment is developed as viewed from the axial direction.

In addition, the stopper ring 223 does not come into contact with the other outer clamp element 21*c* when the free end of each of the pair of outer clamp elements 21*b* and 21*c* are fastened together (see FIG. 2). Specifically, the stopper ring 223 has a thickness smaller than a dimension of a gap formed between the free end of each of the pair of outer clamp elements 21*b* and 21*c* when the free ends are fastened together. This configuration is capable of allocating a fastening allowance of the bolt member 221 and managing torque of the bolt member 221.

The gasket 30 is attached between the planar seal surfaces 12*x* of the facing flange portions 12. The gasket 30 has an annular shape with an inner diameter same as or slightly larger than an inner diameter of the flow path of the pair of pipe members 10. The gasket 30 is made of high cleanliness stainless steel such as SUS316 or SUS316L.

Figure 6:
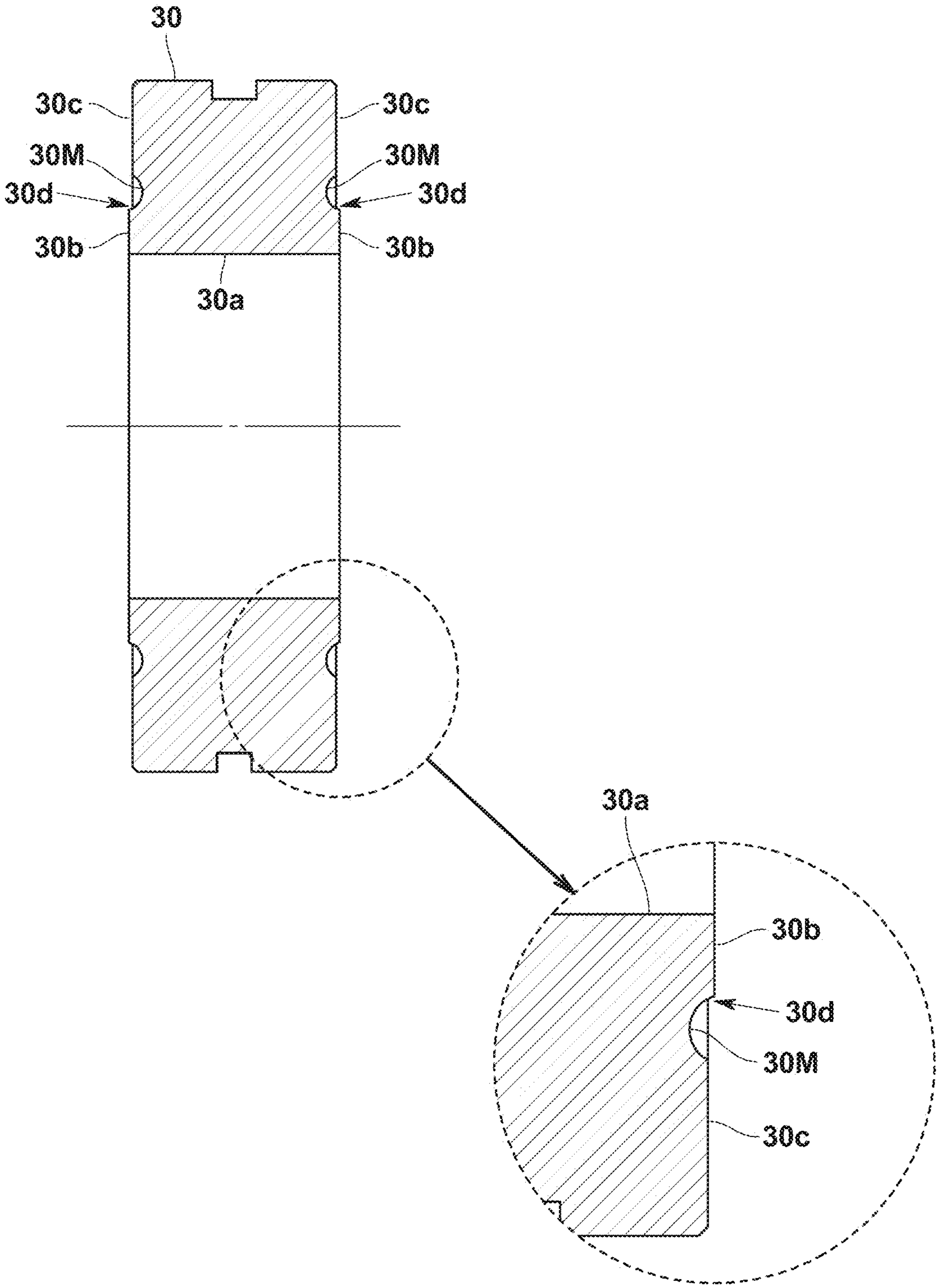
FIG. 6 is a sectional view and a partially enlarged sectional view schematically illustrating a configuration of a gasket of the embodiment.

Specifically, as illustrated in FIG. 6, the gasket 30 has axial end surfaces on a radially inner side continuous with inner peripheral surfaces 30*a* (hereinafter, referred to as radially inner surfaces 30*b*), axial end surfaces on a radially outer side (hereinafter, referred to as radially outer surfaces 30*c*), and steps 30*d* each formed between the corresponding radially inner surface 30*b* and the radially outer surface 30*c*.

The radially inner surface 30*b*, which has an annular shape, has a planar shape orthogonal to the axial direction. In addition, the radially outer surface 30*c*, which has an annular shape larger than that of the radially inner surface 30*b*, has a planar shape orthogonal to the axial direction. The radially inner surface 30*b* is located axially out of the radially outer surface 30*c*. That is, the radially inner surface 30*b* protrudes axially outward with respect to the radially outer surface 30*c*. In the present embodiment, the radially inner surface 30*b* protrudes outward by 0.03 to 0.09 mm along the axial direction with respect to the radially outer surface 30*c*.

Further, the step 30*d* is formed between the radially inner surface 30*b* and the radially outer surface 30*c*. The step 30*d* has an annular shape. The dimension of the step 30*d* along the axial direction is 0.03 to 0.09 mm. An annular groove 30M is formed along the circumferential direction in the step 30*d* of the present embodiment, that is, between the radially inner surface 30*b* and the radially outer surface 30*c*. The groove 30M can absorb a plastically deformed portion of the radially inner surface 30*b*. The cross-sectional shape of the groove 30M along the axial direction may have, in addition to an arc shape, a V-shape or a rectangular shape.

Next, a method of connecting the pair of pipe members 10 by the clamp joint 20 and a mechanism of sealing the joint structure using the gasket 30 of the present embodiment will be described with reference to FIG. 7.

The flange portions 12 of the pair of pipe members 10 face each other with the gasket 30 interposed between the flange portions 12. At this time, as illustrated in FIG. 7 at (a), the holder 50 holding the gasket 30 is attached to the step portion 15 formed in the flange portion 12 of one pipe member 10. The gasket 30 is then sandwiched between the flange portion 12 of the other pipe member 10.

In this state, the clamp body 21 is attached so as to surround the pair of flange portions 12. The recessed groove 211 of each of the clamp elements 21*a* to 21*c* is then fitted over the outer peripheral edge portions of the pair of flange portions 12. Screwing the bolt member 221 into the female screw hole 222 fastens the free end of each of the pair of outer clamp elements 21*b* and 21*c* together. Thereby, the inner peripheral diameter of the clamp body 21 is reduced, the inclined surface 213 of each of the clamp elements 21*a* to 21*c* presses the inclined surface 14 of each flange portion 12, and the flange portions 12 are pressure-fitted to each other by a component force in the axial direction generated at that time.

Figure 7:
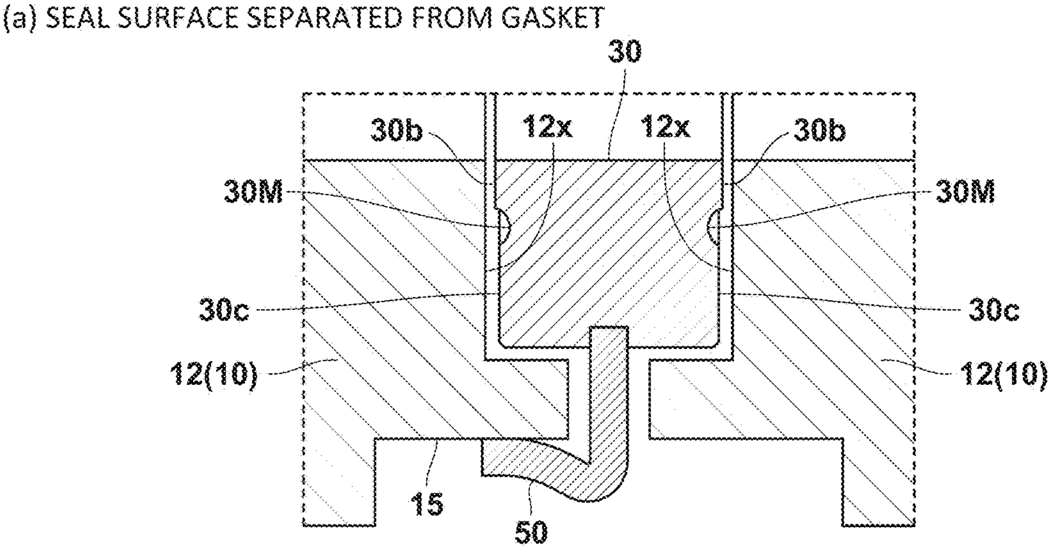
FIG. 7 is a sectional view schematically illustrating a sealing mechanism of the joint structure using the gasket of the embodiment.
Figure 7:
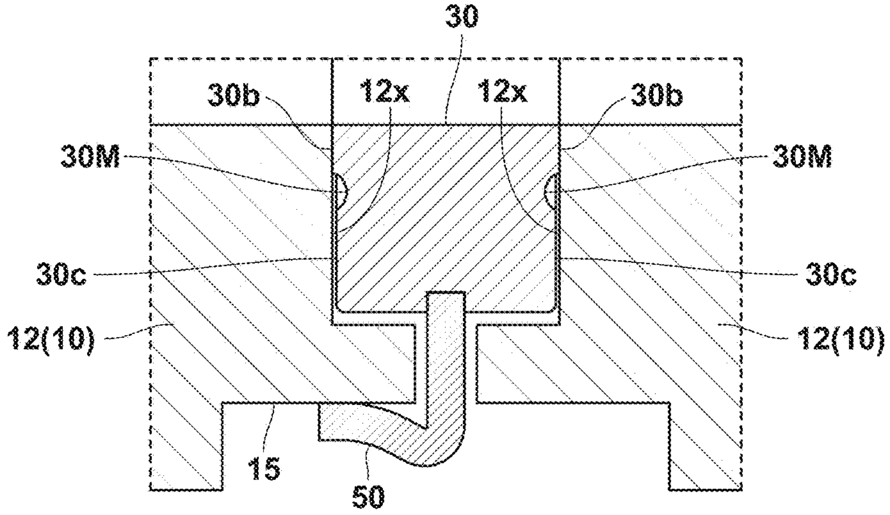
Figure 7:
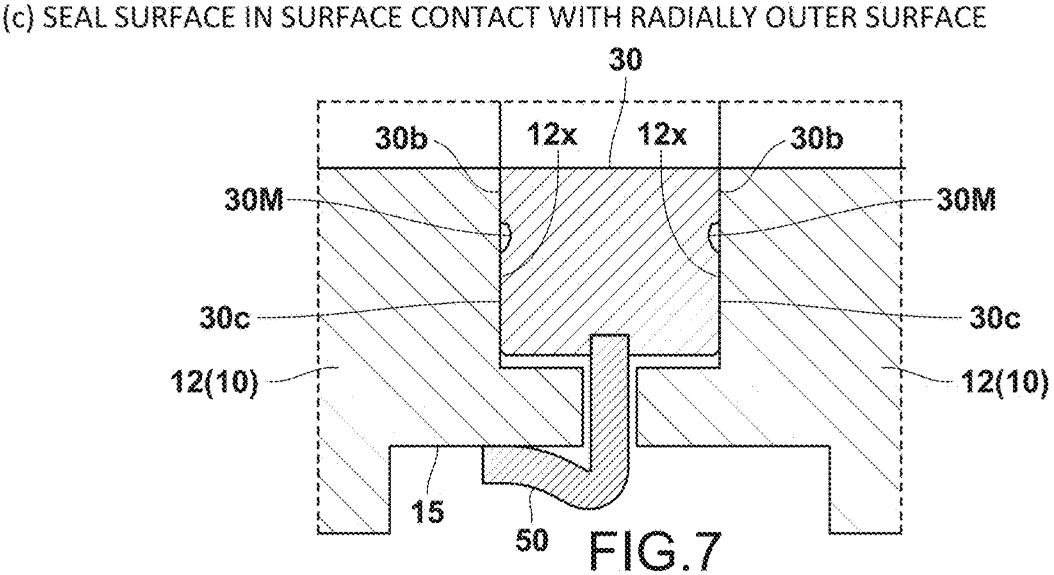

When the flange portions 12 are pressure-fitted to each other, first, the seal surface 12*x* of each flange portion 12 comes into surface contact with the corresponding radially inner surface 30*b* of the gasket 30, as illustrated in FIG. 7 at (b). As the flange portions 12 are pressure-fitted to each other, then, each radially inner surface 30*b* plastically deforms while being in surface contact with the corresponding seal surface 12*x*, as illustrated in FIG. 7 at (c). The portion deformed by the plastic deformation enters the groove 30M formed in the step 30*d*. In addition, the seal surface 12*x* of the flange portion 12 is not only in surface contact with the radially inner surface 30*b* of the gasket 30, but also in surface contact with the radially outer surface 30*c* of the gasket 30. The radially inner surface 30*b* and the radially outer surface 30*c* are thus flush with each other when the flange portions 12 are fastened together.

By fastening the fastening mechanism 22 in this manner, the radially inner surface 30*b* plastically deforms until being flush with the radially outer surface 30*c*, and the gasket 30 comes into close contact with substantially the entire surface of the seal surface 12*x*. A surface pressure of the plastically-deformed radially inner surface 30*b*, which is larger than that of the radially outer surface 30*c*, completely seals a seal portion (a portion between the radially inner surface 30*b* and the seal surface 12*x*) without a gap. In addition, the inner peripheral surface 30*a* of the gasket 30 and the inner peripheral surface formed by the flow path of each pipe member 10 is substantially flush with each other. In the joint structure 100 of the present embodiment, the radially inner surface 30*b* achieves a surface pressure $\sigma$=350 $N/mm^2$ and the radially outer surface 30*c* achieves a surface pressure $\sigma$=250 $N/mm^2$ of by fastening the fastening mechanism 22, so that the scalability is ensured at a required surface pressure of metal flat seal $\sigma$>180 $N/mm^2$ (JIS standard).

Effects of the Present Embodiment

According to the clamp joint 20 of the present embodiment having the configuration described above, the radially inner surface 30*b* comes into surface contact with the seal surface 12*x* to be plastically deformed and then the radially outer surface 30*c* comes into contact with the seal surface 12*x* when the flange portions 12 are fastened. Fastening the flange portions 12 thus maximizes scalability at a gas contact side (the radially inner side) of the gasket 30, reliably eliminating a dead space between the gasket 30 and the seal surfaces 12*x* of the flange portions. In addition, since the gas contact side has the highest sealability, leakage is detected when a dead space is formed. The presence or absence of a dead space can therefore be detected by a leak test such as a helium leak test.

In addition, in the present embodiment, the upper surface portions 212*a* of the pair of side wall portions 212 provided in the central clamp element 21*a* are formed from the pair of second connection portions 216 on one end to the pair of second connection portions 216 on the other end in the circumferential direction. This configuration is capable of improving mechanical strength of the central clamp element 21*a* in the clamp joint 20. As a result, the mechanical strength of the entire clamp joint 20 can be improved and the clamp joint 20 is unlikely to be damaged even if the radially inner surface 30*b* is fastened until plastically deformed. In addition, the mechanical strength of the central clamp element 21*a* can also be improved by fixing the hinge pins 214 to fixation holes of the central clamp element 21*a* by, for example, caulking or press-fitting. As a result, further safety of the clamp joint 20 can be ensured.

OTHER EMBODIMENTS

The present invention is not limited to the embodiment described above.

For example, in the embodiment described above, the inclined surface 213 is formed on the entire inner surface of the corresponding side wall portion 212 of the central clamp element 21*a*. However, the inclined surface 213 may be formed on a part of the inner surface of the side wall portion 212 of the central clamp element 21*a*.

In addition, in the embodiment described above, the upper surface portion 216*a* of the second connection portion 216 and the upper surface portion 212*a* of the side wall portion 212 are linearly continuous when viewed from the axial direction. However, as long as the upper surface portion 212*a* of the side wall portion 212 is continuous to the second connection portion 216, the upper surface portions 212*a* and 216*a* are not necessarily linearly continuous.

Further, the fastening mechanism 22 may have, in addition to the configuration in which the bolt member 221 is screwed into the female screw hole 222 formed in the other outer clamp element 21*c*, a configuration in which a through hole through which the bolt member 221 is inserted is formed in the free end of the other outer clamp element 21*c* and a nut member is screwed over the bolt member 221 extending from the through hole.

The gasket 30 of the embodiment described above has the groove 30M in the step 30*d*; however, the step 30*d* does not necessarily have the groove 30M.

Figure 8:
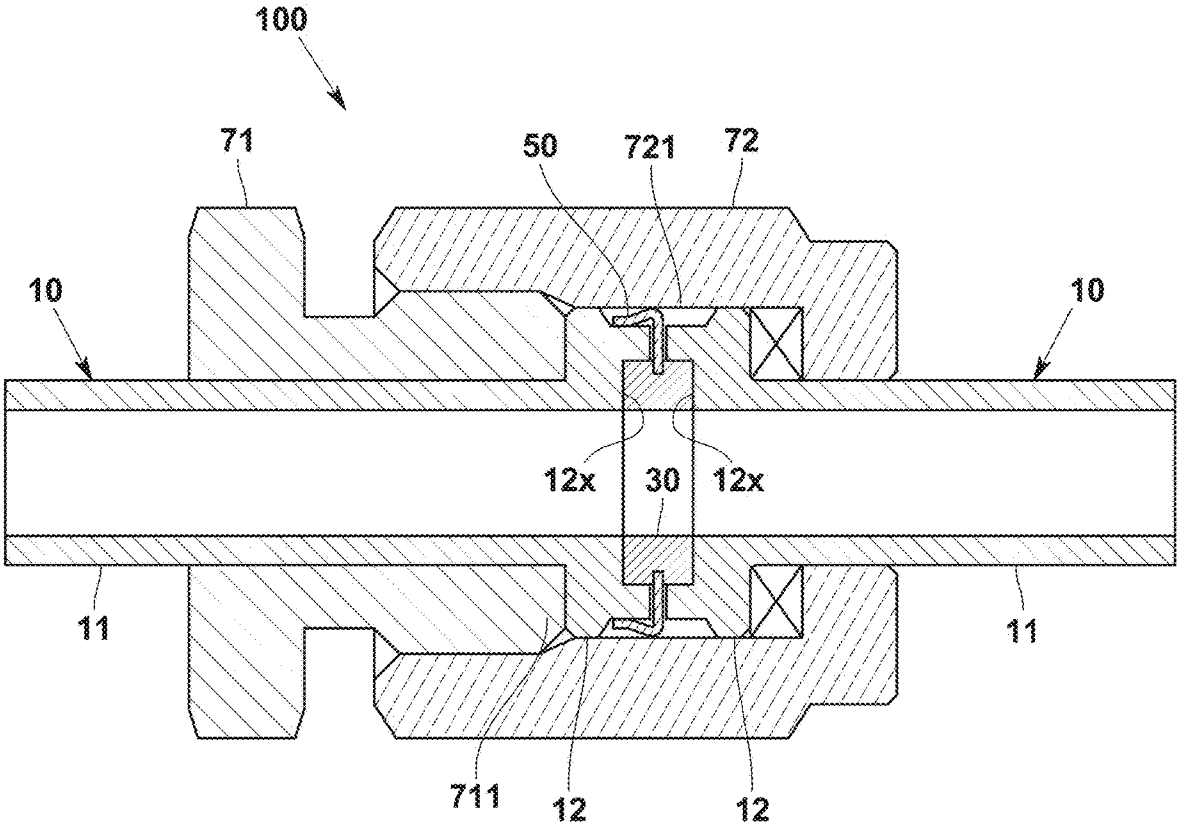
FIG. 8 is a sectional view of a joint structure according to a modification.

The joint structure 100 of the embodiment described above has a configuration in which the flange portions 12 are fastened together by the clamp joint 20. However, as illustrated in FIG. 8, a pipe joint may include a first nut member 71 fitted to an outer periphery of one pipe member 10 and formed with a male screw portion on an outer peripheral surface and a second nut member 72 fitted to an outer periphery of the other pipe member 10 and formed with a female screw portion on an inner peripheral portion to be screwed with the male screw portion. The pair of pipe members 10 may be connected to each other by screwing the male screw portion of the first nut member 71 and the female screw portion of the second nut member 72 together.

More specifically, a tip portion 711 of the first nut member 71 pushes the flange portion 12 of the one pipe member 10 from the back side. In addition, the second nut member 72 is provided with an accommodating recess 721 that accommodates the flange portion 12 of each of the pair of pipe members 10, and a bottom surface of the accommodating recess 721 receives the flange portion 12 of the other pipe member 10 from the back side. With this configuration, by screwing the male screw portion of the first nut member 71 and the female screw portion of the second nut member 72 together, the first nut member 71 pushes the flange portion 12 of the one pipe member 10 from the back side and the second nut member 72 receives the flange portion 12 of the other pipe member 10 from the back side. As a result, the seal surfaces 12*x* surface contact with the gasket 30 to air-tightly connect the pair of pipe members 10 to each other as the embodiment described above.

The present invention is not limited to the embodiment described above, and it goes without saying that various modifications can be made without departing from the gist of the present invention.

100 Joint structure
12 Flange portion
12*x* Seal surface
30 Gasket
30*a* Inner peripheral surface
30*b* Radially inner surface
30*c* Radially outer surface
30*d* Step
30M Groove

What is claimed is:

1. An annular gasket attached between planar seal surfaces of opposing flange portions, wherein steps are formed between axial end surfaces on a radially inner side continuous with an inner peripheral surface, which are hereinafter referred to as radially inner surfaces, and axial end surfaces on a radially outer side, which are hereinafter referred to as radially outer surfaces, each radially inner surface is located axially outward the corresponding radially outer surface, the radially inner surface and the radially outer surface each have a planar shape orthogonal to an axial direction and are configured to come into contact with the planar seal surfaces, each radially outer surface comes into contact with the corresponding seal surface after each radially inner surface comes into contact with the corresponding seal surface, grooves are formed along a circumferential direction between the radially inner surfaces and the radially outer surfaces, and the radially inner surfaces are pressed by the seal surfaces and thereby deformed so that deformation thereof is relieved toward the grooves located radially outward of the radially inner surfaces.

2. The gasket according to claim 1, wherein a dimension of each step along the axial direction is 0.03 to 0.09 mm.

3. A joint structure in which flange portions are fastened together in a state where an annular gasket is sandwiched between planar seal surfaces of the opposing flange portions, wherein steps are formed between axial end surfaces on a radially inner side continuous with an inner peripheral surface, which are hereinafter referred to as radially inner surfaces, and axial end surfaces on a radially outer side, which are hereinafter referred to as radially outer surfaces in the gasket, each radially inner surface is located axially outward the corresponding radially outer surface, the radially inner surface and the radially outer surface each have a planar shape orthogonal to an axial direction and are configured to come into contact with the planar seal surfaces, each radially outer surface comes into contact with the corresponding seal surface after each radially inner surface comes into contact with the corresponding seal surface, grooves are formed along a circumferential direction between the radially inner surfaces and the radially outer surfaces, and the radially inner surfaces are pressed by the seal surfaces and thereby deformed so that deformation thereof is relieved toward the grooves located radially outward of the radially inner surfaces.

4. The joint structure according to claim 3, wherein at least the radially inner surfaces are plastically deformed causing the radially inner surfaces and the radially outer surfaces to be flush with each other in a state where the flange portions are fastened together.

5. The joint structure according to claim 3, wherein the seal surfaces are mirror-finished.

* * * * *